United States Patent
Ueda et al.

(10) Patent No.: US 9,118,829 B2
(45) Date of Patent: Aug. 25, 2015

(54) IMAGING DEVICE

(75) Inventors: Yuki Ueda, Osaka (JP); Wataru Okamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 246 days.

(21) Appl. No.: 13/535,287

(22) Filed: Jun. 27, 2012

(65) Prior Publication Data

US 2013/0002906 A1    Jan. 3, 2013

(30) Foreign Application Priority Data

Jun. 28, 2011 (JP) ................... 2011-142565

(51) Int. Cl.
*H04N 5/232* (2006.01)
*H04N 5/262* (2006.01)

(52) U.S. Cl.
CPC ....... *H04N 5/23216* (2013.01); *H04N 5/23293* (2013.01); *H04N 5/2621* (2013.01)

(58) Field of Classification Search
CPC ............ H04N 5/23216; H04N 5/2621; H04N 5/23293; H04N 1/00408; H04N 1/2125; H04N 2101/00; H04N 5/23212; H04N 5/2628
USPC ............... 348/231, 239, 345, 333.99, 348/333.01–333.13; 382/264, 275
See application file for complete search history.

(56) References Cited

U.S. PATENT DOCUMENTS

| | | | |
|---|---|---|---|
| 5,678,066 A | 10/1997 | Sato | |
| 6,753,917 B2 | 6/2004 | Tanizoe et al. | |
| 7,714,892 B2 * | 5/2010 | Clark et al. | 348/208.99 |
| 8,045,047 B2 * | 10/2011 | Nikkanen et al. | 348/350 |
| 2004/0041919 A1 | 3/2004 | Yamanaka | |
| 2006/0104523 A1 | 5/2006 | Suzuki | |
| 2006/0257128 A1 * | 11/2006 | Ishito et al. | 396/55 |
| 2006/0290796 A1 * | 12/2006 | Nikkanen et al. | 348/294 |

(Continued)

FOREIGN PATENT DOCUMENTS

| | | |
|---|---|---|
| JP | H11-055560 A | 2/1999 |
| JP | 2001-251540 A | 9/2001 |
| JP | 2011-010243 A | 1/2011 |

OTHER PUBLICATIONS

The Office Action from the co-pending U.S. Appl. No. 13/535,351 issued on Sep. 19, 2014.

(Continued)

*Primary Examiner* — Roberto Velez
*Assistant Examiner* — Tuan Le
(74) *Attorney, Agent, or Firm* — Shinjyu Global IP (57) ABSTRACT

An imaging device is provided that includes an imaging component, an image processor a display component, and a controller. The imaging component is configured to capture a subject image and produce image information that corresponds to the subject image. The image information has a first region and a second region. The image processor is configured to perform a vignette processing on the second region to produce a vignetted image. The image processor is further configured to enlarge at least part of the first region to produce an enlarged image according to an operation signal from an interface component. The display component is configured to display the vignetted image on the second region and the enlarged image on the first region. The controller is configured to control at least one of the imaging component, the image processor, and the display component.

6 Claims, 9 Drawing Sheets

(56) References Cited

U.S. PATENT DOCUMENTS

| | | | |
|---|---|---|---|
| 2008/0278618 A1 | 11/2008 | Matsumoto et al. | |
| 2009/0021633 A1* | 1/2009 | Fukumoto et al. | 348/362 |
| 2009/0290047 A1 | 11/2009 | Sogoh et al. | |
| 2010/0149402 A1* | 6/2010 | Aoki et al. | 348/333.12 |
| 2010/0194851 A1* | 8/2010 | Pasupaleti et al. | 348/36 |
| 2010/0259647 A1* | 10/2010 | Gann | 348/239 |
| 2011/0181602 A1 | 7/2011 | Boda et al. | |
| 2011/0193984 A1* | 8/2011 | Kitaya et al. | 348/222.1 |

OTHER PUBLICATIONS

Nikon Corp., Digital Camera D3000 Reference Manual published in 2009, user's manual, p. 169.

Canon Inc., IXY 400f Camera User Guide, user's manual published in 2010, p. 58.

The Office Action from the co-pending U.S. Appl. No. 13/535,351 issued on Feb. 10, 2015.

* cited by examiner

IMAGING DEVICE

CROSS-REFERENCE TO RELATED APPLICATIONS

This application claims priority under 35 U.S.C. §119 to Japanese Patent Application No. 2011-142565 filed on Jun. 28, 2011. The entire disclosure of Japanese Patent Application No. 2011-142565 is hereby incorporated herein by reference.

BACKGROUND

1. Technical Field

The present invention relates to an imaging device that captures a subject image and produces image information. More specifically, the present invention relates to an imaging device with settings that can be used on the captured image information.

2. Background Information

With some conventional imaging devices, the user can be given a field angle effect that is just as if a diorama (miniature) were captured, by subjecting part of the captured image to filtering with a vignetting effect (called diorama filtering, etc.) (See, for example, Japanese Laid-Open Patent Application 2011-010243).

A diorama filter performs vignette processing on part of a screen, such as the left or right of the screen, or the top or bottom of the screen, when imaging subjects have a distance differential, etc. This diorama filtering allows a field angle effect to be represented that simulates the capture of a diorama (a visual effect that makes it seems as if the imaged subject is smaller than it actually is).

Also, there are known imaging devices that have a manual focus (hereinafter abbreviated as MF) assist function. (See, for example, Japanese Laid-Open Patent Application H11-055560). With MF assist, a certain area of a captured image is displayed larger than usual, which makes it easier to check the focal state for the subject in MF mode.

SUMMARY

With conventional imaging devices equipped with an MF assist function, a certain area is automatically enlarged for display when the user performs a focusing operation. However, since the position of this area is fixed, this result in the problem that the subject for which the user wants to check the focal state is not included inside this area. Accordingly, with a conventional imaging device, the user had to move the area to the desired position by working an interface component on the imaging device.

In light of the above problem, one object of the technology disclosed herein is to present an imaging device with a more user friendly MF assist.

An imaging device disclosed herein is provided that includes an imaging component, an image processor, a display component, and a controller. The imaging component is configured to capture a subject image and produce image information that corresponds to the subject image. The image information has a first region and a second region. The image processor is configured to perform a vignette processing on the second region to produce a vignetted image. The image processor is further configured to enlarge at least part of the first region to produce an enlarged image according to an operation signal from an interface component. The display component is configured to display the vignetted image on the second region and the enlarged image on the first region. The controller is configured to control at least one of the imaging component, the image processor, and the display component.

BRIEF DESCRIPTION OF DRAWINGS

Referring now to the attached drawings which form a part of this original disclosure.

DETAILED DESCRIPTION OF THE INVENTION

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

The digital camera 100 in Embodiment 1 is capable of imaging in which diorama filtering is performed by a diorama filter. The digital camera 100 also has the function of moving the position of an effect frame (discussed below) that indicates the range over which the vignette effect is applied by the filter prior to imaging, and setting coordinates. The digital camera 100 also has a manual focus (MF) assist function of enlarging a specific area when the user operates MF, and has the function of moving the position of the region that is enlarged for display, according to the position of the effect frame of the diorama filter. The digital camera 100 performs imaging control on the basis of these functions and settings. The configuration and operation of the digital camera 100 will now be described.

1. Configuration

The configuration of the digital camera 100 will now be described through reference to the drawings.

1-1. Configuration of Digital Camera 100

Figure 1:
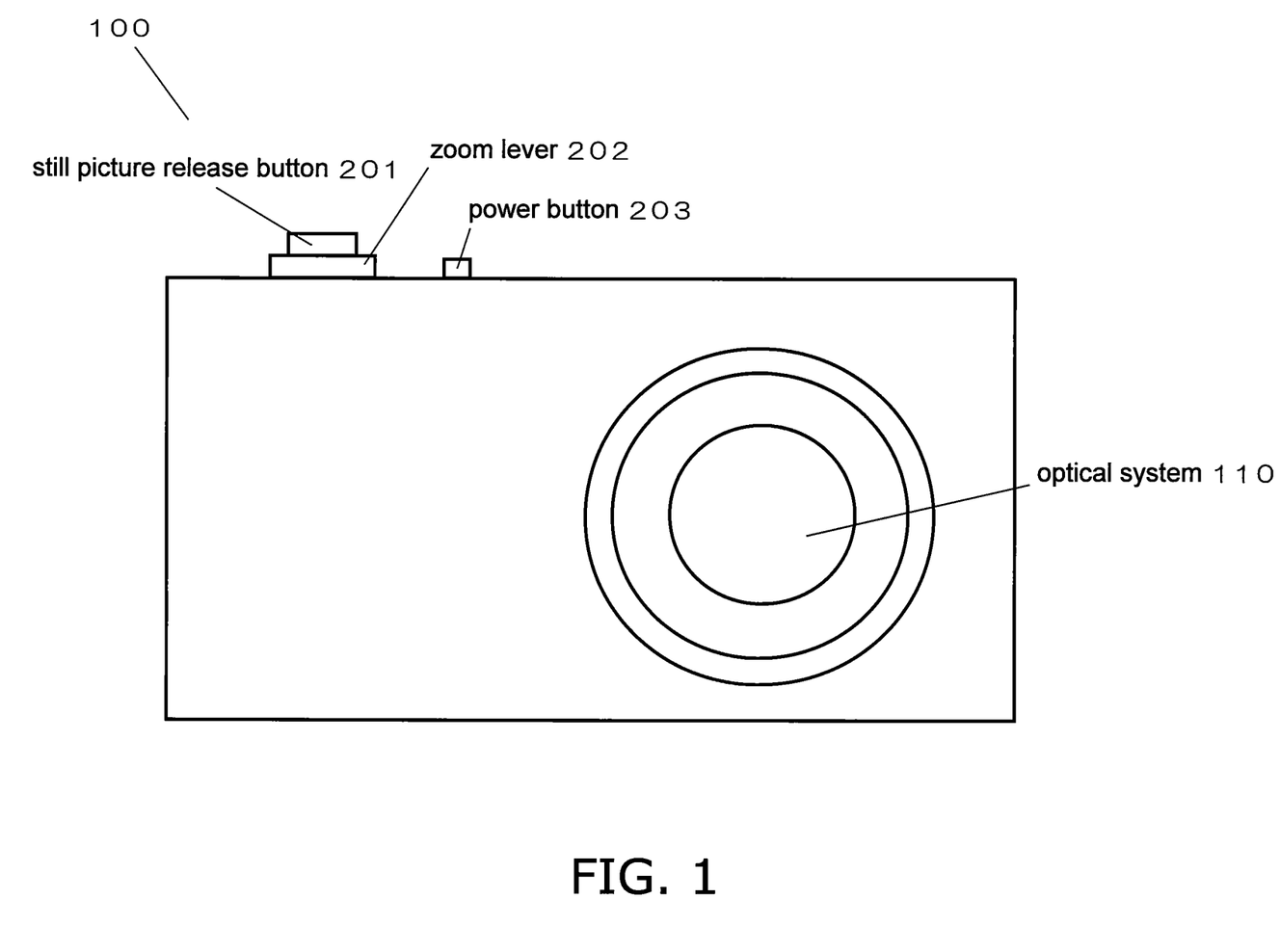
FIG. 1 is a front configuration diagram of a digital camera 100 pertaining to Embodiment 1.

FIG. 1 is a front configuration diagram of the digital camera 100. The front face of the digital camera 100 is provided with a lens barrel that contains an optical system 110. The top face of the digital camera 100 is provided with a still picture release button 201, a zoom lever 202, a power button 203, and other such control buttons.

Figure 2:
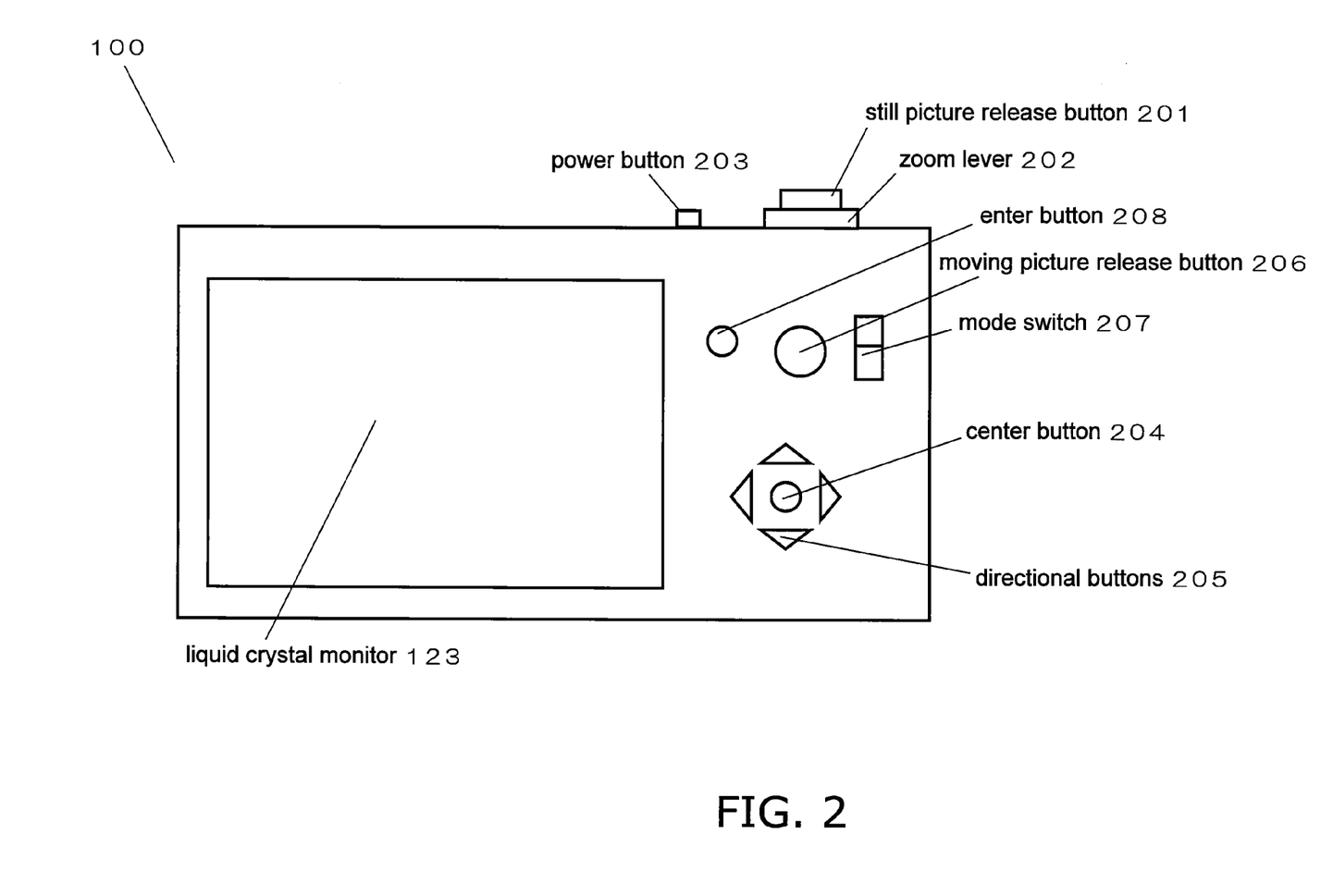
FIG. 2 is a rear configuration diagram of the digital camera 100 pertaining to Embodiment 1.

FIG. 2 is a rear configuration diagram of the digital camera 100. The rear face of the digital camera 100 is provided with a liquid crystal monitor 123, a center button 204, directional buttons 205, a moving picture release button 206, a mode switch 207, an enter button 208, and other such control buttons.

Figure 3:
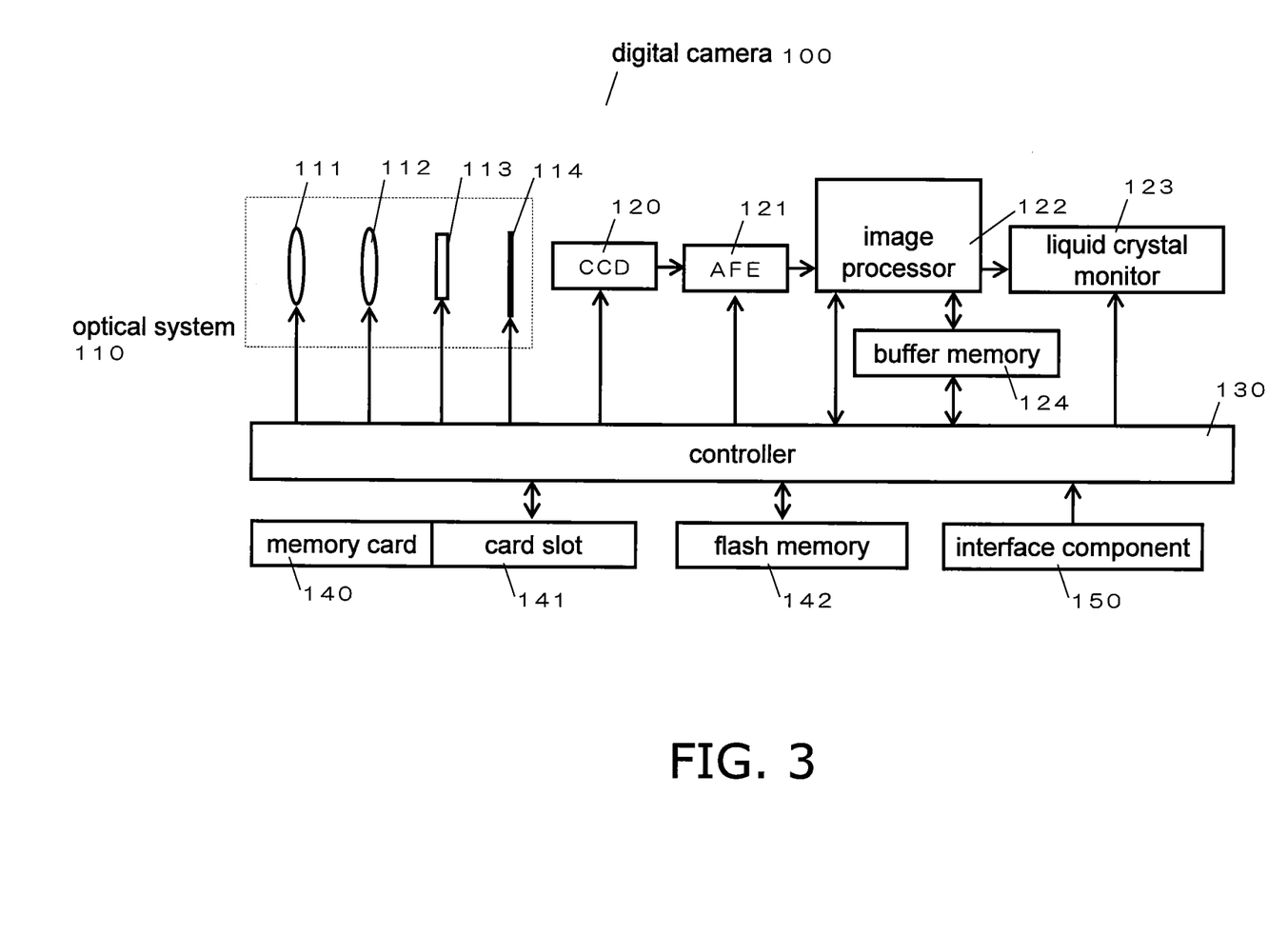
FIG. 3 is an electrical configuration diagram of the digital camera 100 pertaining to Embodiment 1.

FIG. 3 is an electrical configuration diagram of the digital camera 100. The digital camera 100 uses a CCD image sensor 120 to capture a subject image formed by the optical system 110. The CCD image sensor 120 produces image information based on the captured subject image. The image information produced by imaging is subjected to various kinds of processing by an AFE (analog front end) 121 and an image processor 122. The image information thus produced is recorded to a flash memory 142 or a memory card 140. The image information recorded to the flash memory 142 or the memory card 140 is displayed on the liquid crystal monitor 123 when the user operates an interface component 150. The configurations shown in FIGS. 1 to 3 will now be described in detail.

The optical system 110 is made up of a focus lens 111, a zoom lens 112, an aperture 113, a shutter 114, and so forth. Although not depicted in the drawings, the optical system 110 may include an optical shake correcting lens OIS (optical image stabilizer). The various lenses that make up the optical system 110 may each consist of any number of lenses, and may each consist of any number of groups.

The focus lens 111 is used to adjust the focal state of the subject. The zoom lens 112 is used to adjust the image angle of the subject. The aperture 113 is used to adjust the amount of light incident on the CCD image sensor 120. The shutter 114 adjusts the exposure time of light incident on the CCD image sensor 120. The focus lens 111, the zoom lens 112, the aperture 113, and the shutter 114 are each driven by a corresponding DC motor, stepping motor, or other such drive unit, according to a control signal sent from a controller 130.

The CCD image sensor 120 produces image information by capturing a subject image formed by the optical system 110. The CCD image sensor 120 produces a new frame of image information for each specific unit of time when the digital camera 100 is in imaging mode.

With the AFE 121, the image information read from the CCD image sensor 120 is subjected to noise suppression by correlated double sampling, to amplification to the input range width of an A/D converter by an analog gain controller, and to A/D conversion by an A/D converter. After this, the AFE 121 outputs the image information to the image processor 122.

The image processor 122 performs various kinds of processing on the image information outputted from the AFE 121. Examples of this processing include smear correction, white balance correction, gamma correction, YC conversion processing, electronic zooming, extraction processing, compression processing, and expansion processing, but this list is not intended to be comprehensive. The extraction processing referred to here is processing in which all or part of the image information read from the CCD image sensor is cut out (extracted). The cutting range here is decided according to the aspect ratio of the image information (moving or still picture) to be recorded. Information related to the aspect ratio of the image information to be recorded is recorded to the flash memory 142, as will be discussed below. The image processor 122 stores the image information that has undergone the various kinds of processing in a buffer memory 124. The image processor 122 may be constituted by a hard-wired electronic circuit, or may be constituted by a microprocessor or the like in which a program is used. It may also be constituted by a single semiconductor chip along with the controller 130, etc.

The liquid crystal monitor 123 is provided to the rear face of the digital camera 100. The liquid crystal monitor 123 displays an image based on the image information processed by the image processor 122. Images displayed on the liquid crystal monitor 123 include through-images and recorded images. A through-image is one in which images for new frames produced by the CCD image sensor 120 at specific time intervals are continuously displayed. Usually, when the digital camera 100 is in imaging mode, the image processor 122 produces a through-image from the image information produced by the CCD image sensor 120. The user can capture images while checking on the composition of the subject by referring to the through-image displayed on the liquid crystal monitor 123. A recorded image is one in which a high-resolution image recorded to the memory card 140, etc., is reduced to a low resolution in order to be displayed on the liquid crystal monitor 123 when the digital camera 100 is in reproduction mode. The high-resolution image information recorded to the memory card 140 is produced by the image processor 122 on the basis of the image information produced by the CCD image sensor 120 after the user has operated the release button.

The controller 130 performs overall control over the operation of the entire digital camera 100. The controller 130 also records image information stored in the buffer memory 124 (after being processed by the image processor 122) to the memory card 140 or another such recording medium. The controller 130 is constituted by a CPU or the like that processes various kinds of information by executing a program, or a ROM that holds programs and other such information. The ROM holds programs for overall control of the entire digital camera 100, as well as for file control, auto-focus control (AF control), and auto-exposure control (AE control).

The controller 130 may be constituted by a hard-wired electronic circuit, or may be constituted by a microprocessor or the like. It may also be constituted by a single semiconductor chip along with the image processor 122, etc. Also, the ROM need not be built into the interior of the controller 130, and may instead be provided outside of the controller 130.

The buffer memory 124 is a memory unit that functions as a working memory for the controller 130 and the image processor 122. The buffer memory 124 is made up of a DRAM (dynamic random access memory) or the like. Also, the flash memory 142 functions as an internal memory for recording image information, setting information, and so forth. Examples of setting information in imaging using a diorama filter include the coordinate values of the location of the effect frame used for a diorama filter (a filter frame position P). Examples of setting information in imaging using MF assist include the coordinate values of the location of the frame used for MF assist (MF assist frame location L). In addition, a diorama on/off flag indicating whether or not to apply diorama filtering to image information, an MF assist on/off flag indicating whether or not to use MF assist, and so forth are recorded to the flash memory 142.

A card slot 141 is a connection unit that allows the memory card 140 to be inserted and removed. The card slot 141 allows the memory card 140 to be electrically and mechanically connected. The card slot 141 may also have the function of controlling the memory card 140.

The memory card 140 is an external memory equipped with an internal flash memory or other such recording component. The memory card 140 is able to record image information or other such data processed by the image processor 122.

The interface component 150 is the collective name for the interface buttons and dials provided to the outside of the digital camera 100 and operated by the user. For example, this corresponds to the still picture release button 201, moving picture release button 206, zoom lever 202, power button 203, center button 204, directional buttons 205, mode switch 207, enter button 208, and so forth shown in FIGS. 1 and 2. The interface component 150 sends the controller 130 various operational command signals when operated by the user. The controller 130 controls the various components according to the operational command signals.

The still picture release button 201 is a two-stage button that is pressed half-way down or all the way down. When the user presses the still picture release button 201 half-way down, the controller 130 executes AE (auto-exposure) control and decides on the imaging conditions. When the user then presses the still picture release button 201 all the way down, the controller 130 performs imaging processing. The controller 130 records the image information captured at the point when the button was press all the way down, as a still picture to the memory card 140, etc. Hereinafter, when it is simply stated that the still picture release button 201 is pressed, it shall mean that the button is pressed all the way down.

The moving picture release button 206 is a push-button for starting or stopping moving picture recording. When the moving picture release button 206 is pressed by the user, the controller 130 successively records the image information produced by the image processor 122 on the basis of the image information produced by the CCD image sensor 120, as a moving picture to the memory card 140, etc. When the moving picture release button 206 is pressed again, the recording of the moving picture ends.

The zoom lever 202 is type of lever that automatically returns to the center position, and is used to adjust the field angle between the wide angle end and the telephoto end. The zoom lever 202 sends the controller 130 an operational command signal for driving the zoom lens 112 when operated by the user. Specifically, when the zoom lever 202 is operated to the wide angle end side, the controller 130 drives the zoom lens 112 so that the subject is captured at a wide angle. Similarly, when the zoom lever 202 is operated to the telephoto end side, the controller 130 drives the zoom lens 112 so that the subject is captured at telephoto.

The power button 203 is a push button used for switching the power on and off to the various components constituting the digital camera 100. When the power button 203 is pressed by the user while the power is off, the controller 130 supplies power to the various components constituting the digital camera 100, and actuates them. When the power button 203 is pressed by the user while the power is on, the controller 130 stops the supply of power to the various components.

The center button 204 is a push button. When the user presses the center button 204 while the digital camera 100 is in imaging mode or reproduction mode, the controller 130 displays a menu screen on the liquid crystal monitor 123. The menu screen is used to set the various conditions for imaging and reproduction, and allows settings to be made such as switching a shutter sound on or off, and switching diorama filtering on or off. The information set on the menu screen is recorded to the flash memory 142. When the center button 204 is pressed while a setting category for one of the various conditions has been selected, the center button 204 also functions as an enter button.

The directional buttons 205 are push buttons provided in the up, down, left, and right directions. The user presses the directional buttons 205 in one of these directions to select one of the various condition categories displayed on the liquid crystal monitor 123. With the digital camera 100 in this embodiment, in imaging mode the left button of the directional buttons 205 is assigned as a button for actuating the MF mode. In MF mode, the up and down buttons are assigned for changing the focus position.

The mode switch 207 is a push button provided in the up and down directions. The user presses the mode switch 207 in one of these directions to switch the state of the digital camera 100 between imaging mode and reproduction mode.

The enter button 208 is a push button that is pressed when setting a diorama filtering effect for obtaining a diorama filtering effect. When the enter button 208 is pressed in the standby state of the imaging mode, in which the diorama filtering effect is switched on, the controller 130 displays a screen on the liquid crystal monitor for setting the filtering effect of the diorama filter. The filtering effect setting will be discussed in detail below.

The CCD image sensor 120 is an example of an imaging component. The directional buttons 205 are an example of an interface component. The controller 130 is an example of a controller. The controller 130 is also an example of a focus controller. The liquid crystal monitor 123 is an example of a display component.

2. Operation 2-1. Diorama Filter

The diorama filter of the digital camera 100 is a filter that vignettes part of the screen, such as the top and bottom of the screen and/or the left and right of the screen. Vignetting part of the screen yields a visual effect that is just as if a diorama (miniature) were captured, that is, a diorama filtering effect. This diorama filtering effect is particularly produced when there is a small difference in the distance between a plurality of subjects.

Figure 6A:
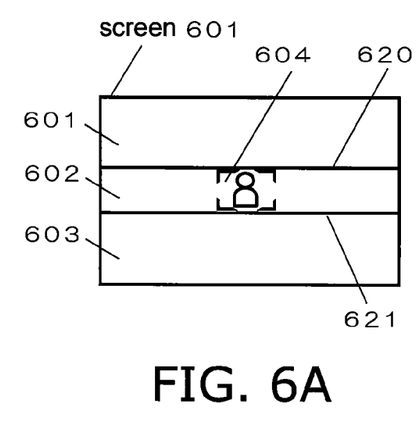
FIG. 6 is a diagram illustrating an example of a screen display pertaining to Embodiment 1.

With a diorama filter, a single screen is divided up into areas 601 and 603 for displaying with vignetting, and an area 602 without any vignetting, such as the screen shown in FIG. 6a. The diorama filter in this embodiment, as shown in FIG. 6a, is such that vignette processing is executed on the top and bottom regions of the screen, and processing that does not impart vignetting is executed for the band-like region located in the center in the vertical direction. Specifically, this diorama filter changes whether or not there is vignetting in the vertical direction of the screen.

The boundary for the diorama filtering effect has a boundary line 620 and a boundary line 621. The boundary line 620 indicates the boundary between the area 601 in which the display is vignetted and the area 602 in which the display is not vignetted. The boundary line 621 indicates the boundary between the area 603 in which the display is vignetted and the area 602 in which the display is not vignetted. Here, the width in the up and down direction and in the left and right direction of the area 602 in which the display is not vignetted is set to a specific width. A filter frame position P is set at the center position in the up and down direction and in the left and right direction of the area 602. Position data for defining this filter frame position P is recorded to the flash memory 142, for example. The user can move the area 602 in which the display is not vignetted by pressing the up or down button of the directional buttons 205. In this case, the areas 601 and 603 also change according to the movement of the area 602.

2-2. MF Assist

Figure 6B:
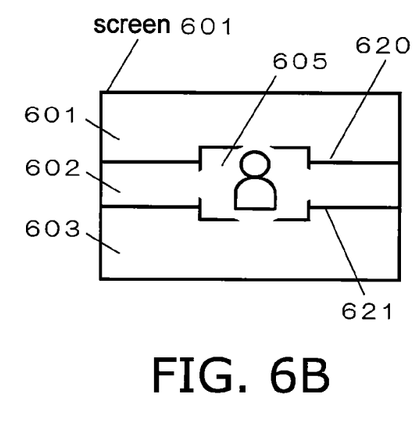

MF assist is a function that makes it easier for the user to check the focal state by enlarging the display of a certain area during manual focusing. More specifically, with the MF assist in this embodiment, the area 604 surrounding the subject (as shown by the screen in FIG. 6a) is displayed enlarged by a specific ratio (such as three times), centering on an MF assist frame location L (as shown by the screen in FIG. 6b). In FIG. 6b, the enlarged image is represented by 605. The area 604 surrounding the subject is a frame indicating the region that is enlarged in the execution of MF assist. The MF assist frame location L is the center position in the right and left direction and the up and down direction of the area 604.

The above-mentioned filter frame position P is defined in a first coordinate system which is set in the liquid crystal monitor 123. The MF assist frame location L is defined in a second coordinate system which is set in the CCD image sensor. Here, the first coordinate system and the second coordinate system correspond to each other so that the position of P in the first coordinate system matches the position of L in the second coordinate system.

2-3. Switching the Diorama Filtering Effect of the Digital Camera 100 on and Off The switching of the diorama filtering effect on and off in the digital camera 100 will now be described. When the mode of the digital camera 100 is changed to imaging mode through operation of the mode switch 207, and the user presses the center button 204, the controller 130 displays a menu screen on the liquid crystal monitor 123. The menu screen is used to set various conditions for recording and reproduction. The user operates the directional buttons 205 to call up an on/off setting menu for the diorama filtering effect and to set the diorama filtering effect to be either on or off. The on/off setting of the diorama filtering effect is recorded as a diorama on/off flag to the flash memory 142. The controller 130 refers to the diorama on/off flag recorded to the flash memory 142 to decide the current setting, that is, whether or not the diorama filtering effect is on. If the diorama on/off flag has been set to on, it is possible to capture an image with a diorama filtering effect in imaging mode. The effect, setting operation, and imaging operation when the diorama filtering effect is on will be described below.

2-4. Switching the MF Assist Mode of the Digital Camera 100 on and Off

The switching of the MF assist mode of the digital camera 100 on and off will now be described. When the user presses the center button 204 while the mode of the digital camera 100 has changed to imaging mode through operation of the mode switch 207, the controller 130 displays a menu screen on the liquid crystal monitor 123. The user operates the directional buttons 205 to call up an on/off setting menu for the MF assist mode and to set the MF assist mode to be either on or off. The on/off setting of the MF assist mode is recorded as an MF assist on/off flag to the flash memory 142. The controller 130 refers to the MF assist on/off flag recorded to the flash memory 142 to decide the current setting, that is, whether or not the MF assist mode effect is on. If the MF assist mode is on, it is possible to execute MF assist.

The digital camera 100 in this embodiment normally operates in AF mode. When the MF assist mode is on, pressing the left button of the directional buttons 205 results in MF mode, and the image indicating the MF assist frame location L is enlarged in display. At this point the up or down button of the directional buttons 205 is used to move the focus position forward or backward. More specifically, the controller 130 detects operation of the up or down button, and controls the optical system 110 so as to move the focus lens 111 forward or backward along the optical axis according to this operation. For example, if the up button is pressed, the focus position is moved to the telephoto side, and if the down button is pressed, the focus position is moved to the wide angle side.

Figure 4:
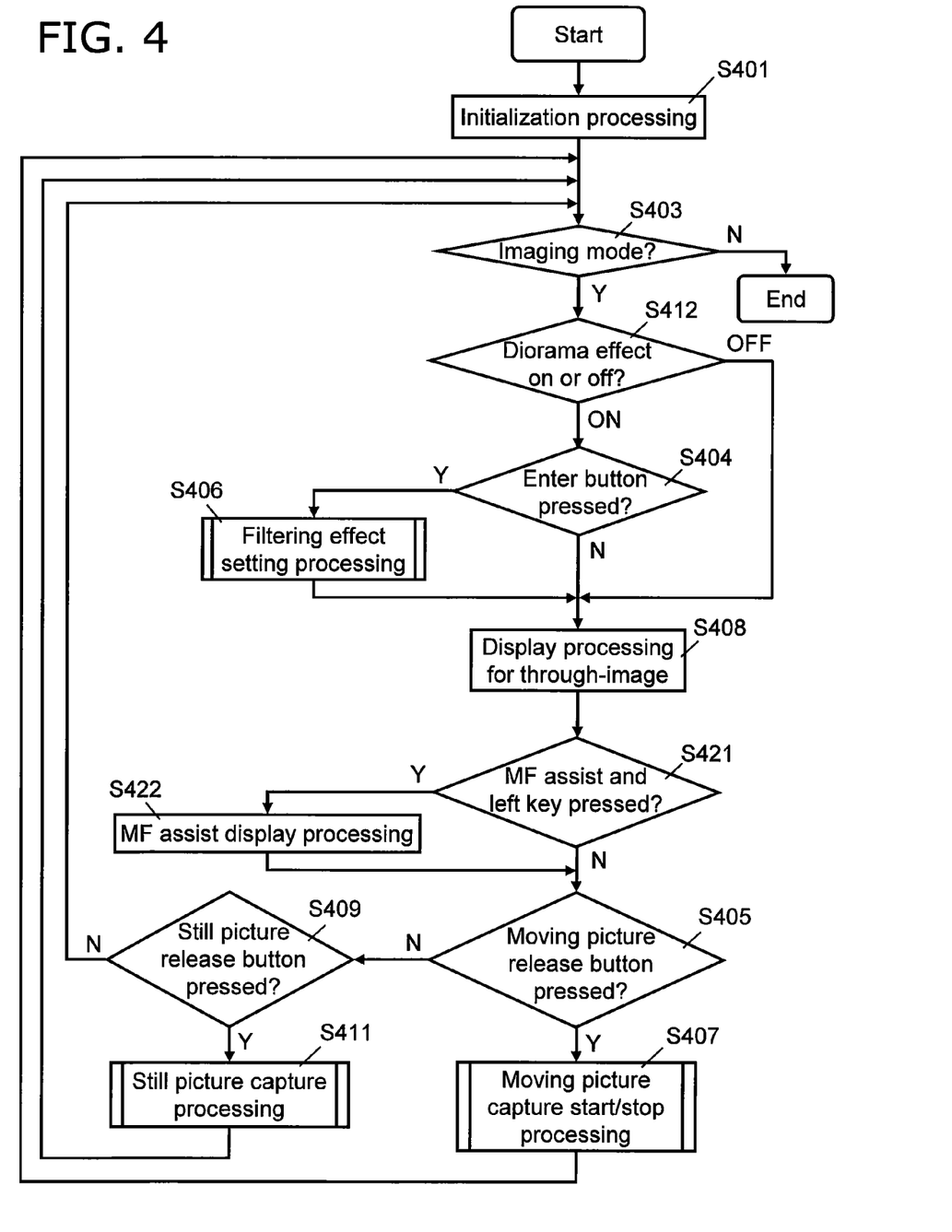
FIG. 4 is a flowchart of the flow of processing in the imaging mode pertaining to Embodiment 1.

2-5. Diorama Filter Setting, MF Assist Display Processing, and Imaging Operation of Digital Camera First, the imaging control of the digital camera 100 will be described. FIG. 4 is a flowchart of imaging control when the digital camera 100 is in imaging mode. The digital camera 100 captures moving pictures and still pictures in imaging mode.

When the user operates the mode switch 207 to put the digital camera 100 in imaging mode, the controller 130 switches the operation of the entire digital camera 100 to imaging mode. In imaging mode, the controller 130 first performs the initialization processing needed for still picture and moving picture recording (S401).

Once initialization is complete, the controller 130 repeats setting processing and display processing corresponding to input from the user. These processing steps include checking the state of the mode switch 207 (S403), checking whether the diorama filtering effect is on or off (S412), monitoring the pressing of the enter button 208 (S404), filtering effect setting processing (S406), displaying a through-image (S408), monitoring the pressing of the left button of the directional buttons 205 and the MF assist mode (S421), MF assist display processing (S422), monitoring the pressing of the moving picture release button 206 (S405), and monitoring the pressing of the still picture release button 201 (S409).

Here, in S403, if the mode switch 207 is in imaging mode (Yes in S403), the controller 130 executes at least one of the above-mentioned processing steps of S412, S404, S406, S408, S421, S422, S405, and S409. In S403, if the mode switch 207 is not in imaging mode (No in S403), the processing of imaging mode is ended. In S412, if the diorama filtering effect is not on, the processing of S408 is executed.

The controller 130 monitors the pressing of the enter button 208 in S404, and if the enter button 208 is being pressed (Yes in S404), processing is performed to set the filtering effect (S406). If the user presses the up or down button of the directional buttons 205, the controller 130 sets the filter frame position P used for setting the diorama filter. The controller 130 then records data indicating the filter frame position P to the flash memory 142.

Also, the controller 130 sets the MF assist frame location L used in MF assist. More precisely, the MF assist frame location L is set in conjunction with the setting of the filter frame position P. After this, the controller 130 performs processing to display a through-image that has undergone diorama filtering, on the basis of the setting value set in the filtering effect setting processing (S408). The filtering effect setting processing will be described in detail through reference to the flowchart in FIG. 5.

If the enter button 208 is not being pressed (No in S404), the controller 130 does not execute filtering effect setting processing, and uses the current setting value to perform processing to display a through-image that has undergone diorama filtering (S408).

In S421, if the controller 130 detects that the left button of the directional buttons 205 has been pressed while the MF assist mode is on, the controller 130 performs display processing (MF assist display processing) corresponding to MF assist based on the MF assist frame location L (S422). The MF assist display processing will be described in detail through reference to FIG. 6.

Also, in S405, if the controller 130 detects that the moving picture release button 206 has been pressed (Yes in S405), the controller 130 performs moving picture capture start and stop processing (S407). In S409, if the controller 130 detects that the still picture release button 201 has been pressed (Yes in S409), still picture capture processing is performed (S411). Here, if the answer is No in S409, the processing of S403 is executed. Details of the moving picture capture start and stop processing will be described through reference to the flowchart in FIG. 7. Details of the still picture capture processing will be described through reference to the flowchart in FIG. 8.

The switching of the MF assist on and off that was described in the section titled "2-4. Switching the MF Assist Mode of the Digital Camera 100 On and Off" is executed at any point from S403 to S422 in FIG. 4.

Figure 5:
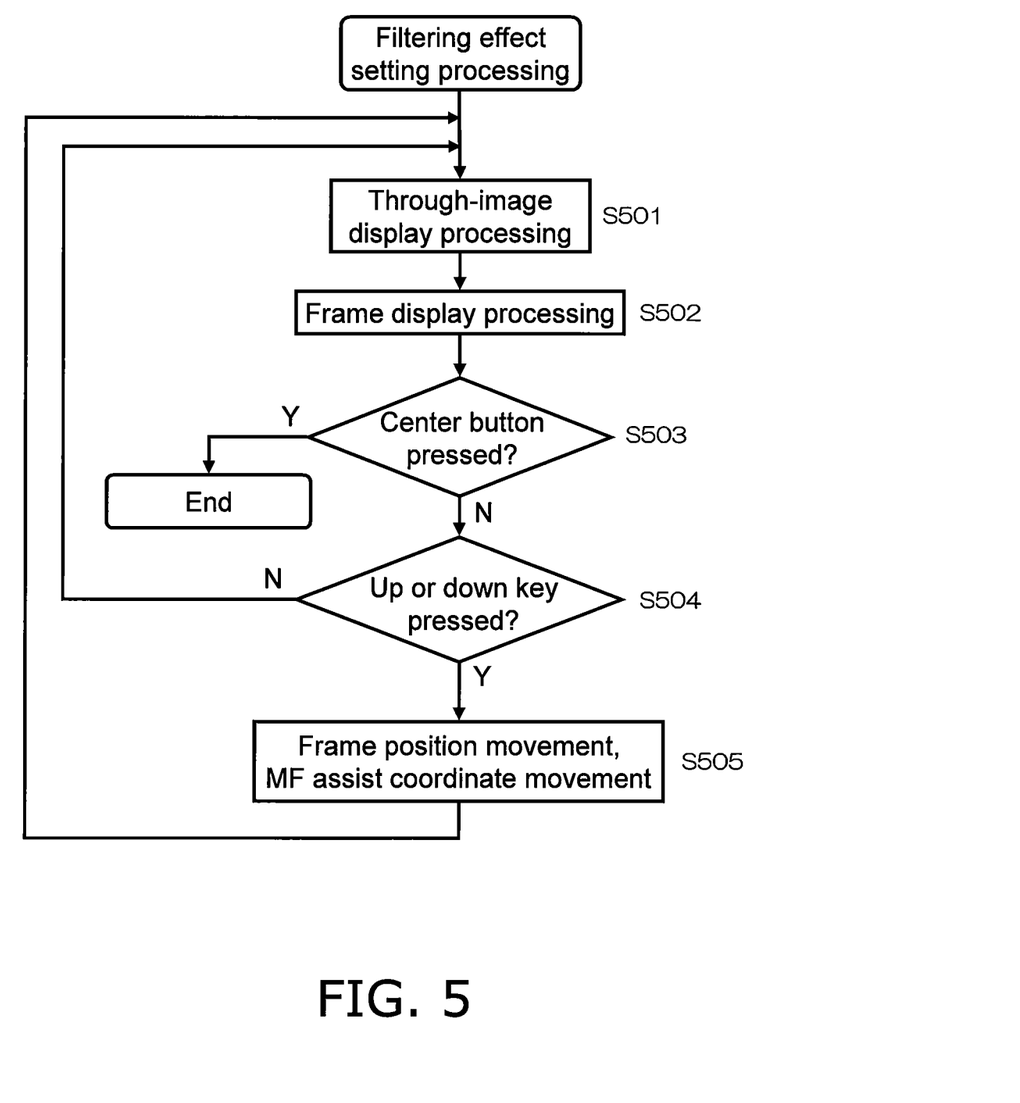
FIG. 5 is a flowchart of the flow of filter effect setting processing pertaining to Embodiment 1.

Next, the processing for setting the diorama filtering effect of the digital camera 100 will be described. FIG. 5 is a flowchart of the flow of processing for setting the diorama filtering effect. FIG. 6 is a diagram illustrating an example of a screen display.

The controller 130 sets an initial setting value and starts processing to set the diorama filtering effect. The filter frame position P for setting the filtering effect is set in the middle in the up and down direction as initial setting values. The MF assist frame location L for setting the MF assist is set in the middle in the up and down direction and in the middle in the left and right direction as initial setting values.

When the initial setting value is set, first the controller 130 controls the image processor 122 to display a through-image on the liquid crystal monitor 123 (S501). Next, a frame for setting the filtering effect is displayed superposed over this through-image (S502) (FIG. 6a). This frame is used to set the up and down ranges, and includes the boundary 620 and the boundary 621. This frame divides the area 602 and the area 601 and 603. The filter processing is not executed in the area 602 which is clear. The filter processing is executed in the areas 601 and 603 which is vignetted. The initial setting value for the filter frame position P is the middle. If the center button 204 is not pressed, the setting is left unchanged (S503), and it is detected that the up or down button of the directional buttons 205 has been pressed (Yes in S503), the controller 130 starts the setting of the filter frame position P (S504). If the pressing of the up or down button is not detected (No in S504), the processing of S501 is executed.

Figure 6C:
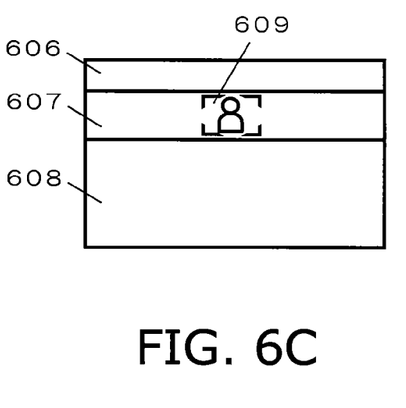

For example, if the up button of the directional buttons 205 has been pressed, the controller 130 moves the filter frame position P by a specific value in the up direction, and records the filter frame position P to the flash memory 142. The controller 130 also moves the MF assist frame location L by the same value in the up direction in conjunction with the movement of the filter frame position P, and records the MF assist frame location L to the flash memory 142 (S505) (FIG. 6c). Even after the filter frame position P and the MF assist frame location L have moved, the display of the frame is divided into an area 607 in which filter processing is not executed and areas 606 and 608 in which filter processing is executed. In this case, the area 609 of the MF assist frame is linked to the position of the filter frame, so a subject which is contained within the area 607 with no vignette effect is enlarged. Specifically, when MF assist is started, the area displayed in vignette can be prevented from being enlarged in display. Also, the region in which no vignette effect is applied can be enlarged in display, and the user can perform MF adjustment while looking at this display.

Figure 6D:
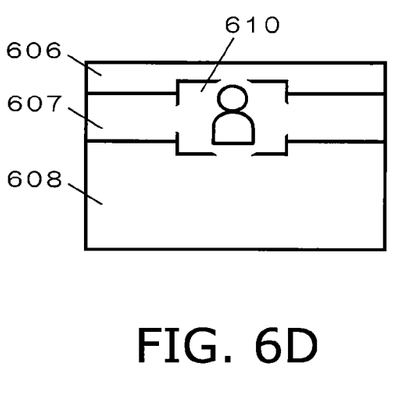
Figure 6E:
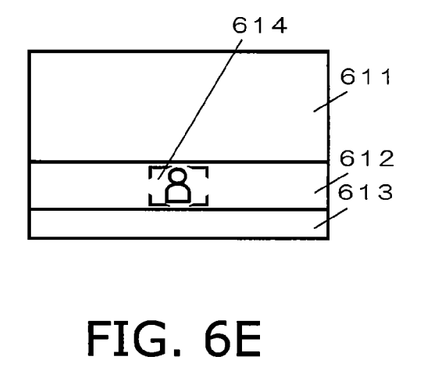

Similarly, when the down button of the directional buttons 205 has been pressed, the controller 130 moves the filter frame position P by a specific value in the down direction, and records the filter frame position P to the flash memory 142. The controller 130 also moves the MF assist frame location L by the same value in the down direction in conjunction with the movement of the filter frame position P, and records the MF assist frame location L to the flash memory 142 (S505) (FIG. 6e). Even after the filter frame position P and the MF assist frame location L have moved, the display of the frame is divided into an area 612 in which filter processing is not executed and areas 611 and 613 in which filter processing is executed. Here again, the position of the area 614 of the MF assist frame is updated in conjunction with the position of the filter frame.

S501 is executed at the end of movement processing of the filter frame position P and movement processing of the MF assist frame location L (S505).

Next, details of the MF assist display processing of S422 will be described. In MF assist display processing, the controller 130 determines whether or not the MF assist mode of the digital camera 100 is on when it is detected that the left button of the directional buttons 205 has been pressed by the user (S421). If the MF assist mode is on (Yes in S421), the controller 130 executes MF assist display processing. In other words, the controller 130 executes MF assist display processing when it is detected that the MF assist is on and the left button of the directional buttons 205 has been pressed. MF assist is switched on or off as desired at any point from S403 to S422 in FIG. 4.

If processing to set the diorama filtering effect (S406) has never been executed, the MF assist frame location L in MF assist is set to its initial value, that is, to the middle. The controller 130 acquires the MF assist frame location L from the flash memory 142 when MF assist display is performed, enlarges the area in the middle indicating the MF assist frame location L, and display the enlarged area (605) (FIG. 6b). More specifically, the area 604 indicating the MF assist frame location L, which is included in the image information, is read from the buffer memory 124 by the image processor 122.

The image processor 122 then subjects the image information of this area 604 to enlargement processing, and displays the result on the liquid crystal monitor superimposed with the original image information (FIG. 6b).

Meanwhile, if the diorama filtering effect setting processing (S406) has already been executed, such as when the filter frame position P is moving in the up direction, the MF assist frame location L is correspondingly updated in the up direction as discussed above. Here again, the controller 130 acquires the MF assist frame location L from the flash memory 142 when MF assist display is performed, enlarges the area in the middle indicating the MF assist frame location L, and display the enlarged area (610) (FIG. 6d). Here, the area indicating the MF assist frame location L is the area in the middle in the left and right direction in the area (607) in which no diorama filtering has been applied. Consequently, the area 607 to which no vignette effect has been applied can be enlarged in display, and MF operation can be assisted.

Figure 6F:
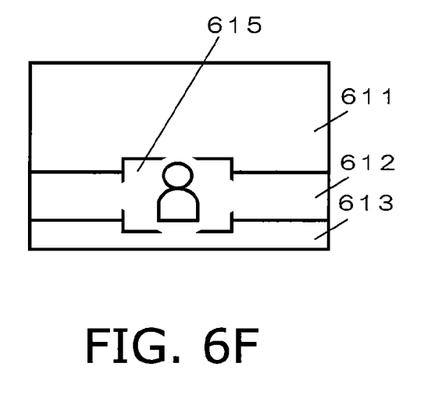

If the diorama filtering effect setting processing (S406) has already been executed, such as when the filter frame position P is moving in the down direction, the MF assist frame location L is correspondingly updated in the down direction as discussed above. Here again, the controller 130 acquires the MF assist frame location L from the flash memory 142 when MF assist display is performed, enlarges the display of the area indicating the MF assist frame location L, and display the enlarged area (615) (FIG. 6f). Here, the area indicating the MF assist frame location L is the area in the middle in the left and right direction in the area (612) in which no diorama filtering has been applied. Consequently, the area 607 to which no vignette effect has been applied can be enlarged in display, and MF operation can be assisted.

The MF assist display is ended when at least a specific amount of time has passed in which the user has not executed any operation for changing the focal state.

Figure 7:
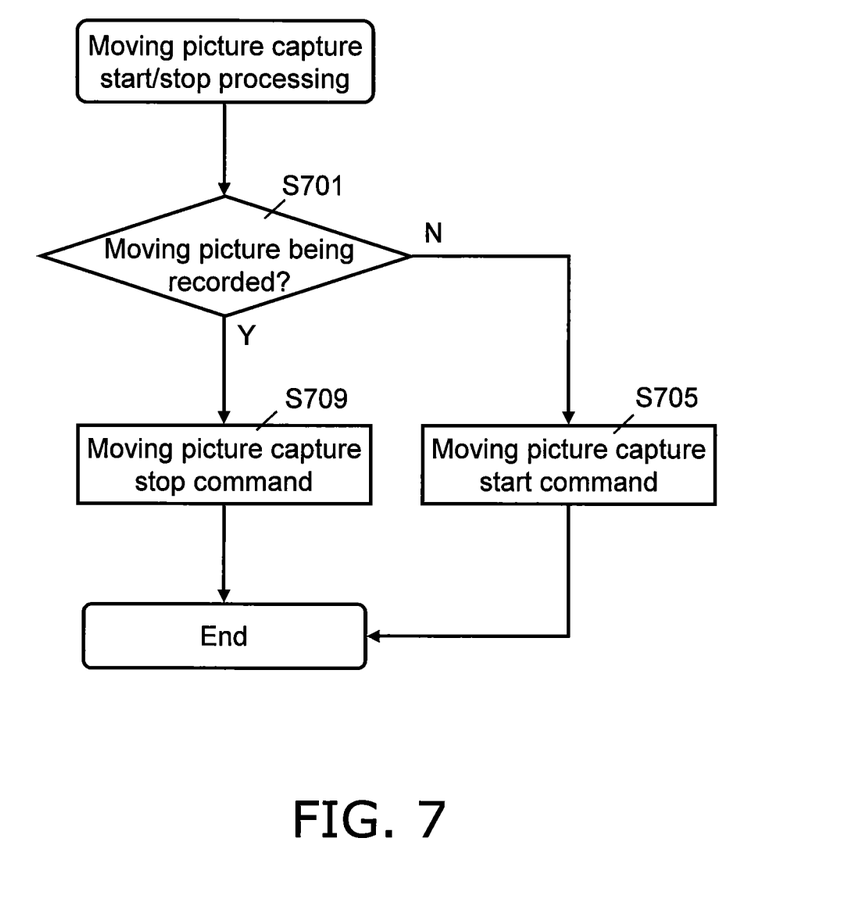
FIG. 7 is a flowchart of the flow of moving picture capture start/stop processing pertaining to Embodiment 1.

FIG. 7 is a flowchart of the flow of moving picture capture start/stop processing. In this moving picture capture start/stop processing, if it is detected that the user has pressed the moving picture release button 206, the controller 130 decides whether or not the digital camera 100 is in the midst of recording a moving picture (S701). If the digital camera 100 is not in the midst of recording a moving picture (No in S701), the controller 130 sends the image processor 122 a command to start recording a moving picture (S705). Upon receiving this moving picture recording start command, the image processor 122 acquires the filter frame position P from the flash memory 142. The image processor 122 then starts recording the moving picture for which diorama filter image processor has been executed. The diorama filter in this embodiment is a filter that performs low-pass filtering on the range in which vignette processing is executed and which is indicated by the filter frame position P, and does not perform low-pass filtering on the range in which vignette processing is not applied.

Next, the image information produced by the image processor 122 is successively recorded to the memory card 140 or another such recording medium on the basis of the image information produced by the CCD image sensor 120. This processing is executed during the time from when the controller 130 issues a command to start moving picture recording to the image processor 122, until the controller 130 issues a command to halt moving picture recording to the image processor 122.

At the start of recording, the image processor 122 acquires the filter frame position P from the flash memory 142. The image processor 122 then subjects the image information produced by the CCD image sensor 120 to diorama filter image processing over the range of the acquired coordinate positions, and the processed image information is recorded to the memory card 140 or another such recording medium. If the digital camera 100 is in the midst of recording a moving picture (Yes in 701), the controller 130 issues a command to stop moving picture recording to the image processor 122 (S709).

Figure 8:
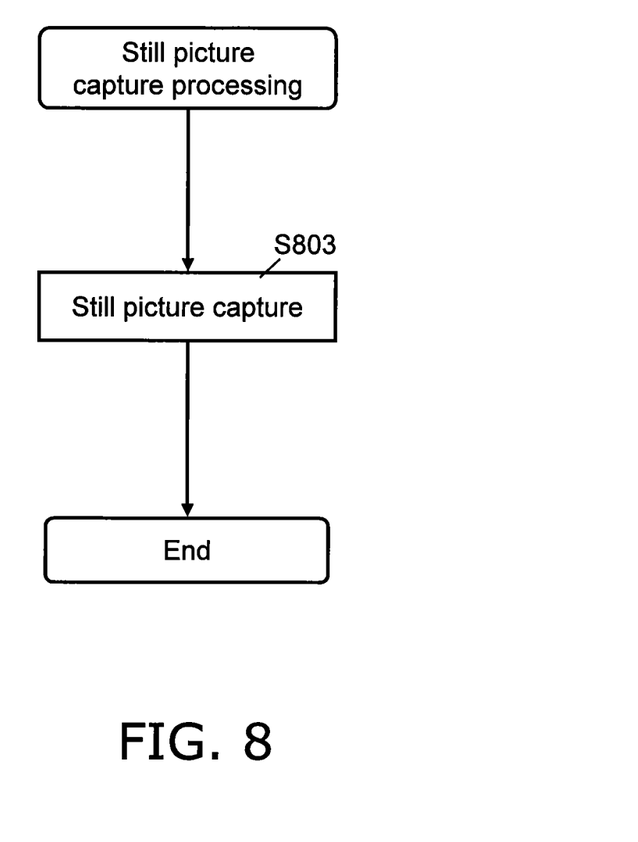
FIG. 8 is a flowchart of the flow of still picture capture processing pertaining to Embodiment 1.

FIG. 8 is a flowchart of the flow of still picture capture processing. If it is detected that the user has pressed the still picture release button 201, the controller 130 records the still picture produced by the image processor 122 to the memory card 140 or another such recording medium on the basis of the image information produced by the CCD image sensor 120, at the point when the still picture release button 201 was pressed (S803). In recording a still picture, the image processor 122 acquires the filter frame position P for the diorama filter from the flash memory 142, subjects the range of the acquired coordinate positions to diorama filter image processing, and records the result to the memory card 140 or another such recording medium.

As discussed above, when performing processing to move the diorama filter frame, the area in which no vignette effect is applied can be displayed enlarged as an MF assist display by updating the movement processing of the MF assist frame in conjunction. Also, the user can easily focus the image while looking at this enlarged display.

2-6. Conclusion

The digital camera 100 in this embodiment comprises the CCD image sensor 120, the image processor 122, the liquid crystal monitor 123, and a controller. The CCD image sensor 120 captures a subject image and produces image information. The image processor 122 performs diorama filter processing on a specific region (one example of "a second region") in the captured image information. The image processor 122 also enlarges at least part of the region (one example of "a first region") excluding the specified region according to an operation signal from an interface component in the image information that has undergone diorama filter processing. The liquid crystal monitor 123 (one example of "a display component") displays the vignetted image that has undergone diorama filter processing and the enlarged image obtained by at least partial enlargement, on the basis of the image information that has undergone the diorama filter processing. The controller controls at least one of the CCD image sensor 120, the image processor 122, and the liquid crystal monitor 123.

With this constitution, at least part of the region in which diorama filtering is not applied (the MF assist frame) can be enlarged in display according to the operation of the interface component 150. Since the focal state of the subject can be easily checked in the inside of the enlarged MF assist frame, this subject can be easily put in focus.

Also, since the digital camera 100 of this embodiment is premised on the use of diorama filtering, the subject whose focal state is to be checked can be easily positioned within the MF assist frame by disposing the MF assist frame in the region in which no diorama filtering is applied.

Other Embodiments

The present invention is not limited to the above embodiment, and various embodiments are possible. Other embodiments of the present invention will be discussed below.

(A) With the digital camera 100 of the above embodiment, an example was given in which the position of the vignetting range (the range of no vignetting) can be set by the user in the diorama filter, and the width of the range of no vignetting could not be set by the user. However, the present invention is not limited to this, and the constitution may be such that the user can specify the width over which filtering is applied (the width of the range of no vignetting). For example, the constitution may be such that the width over which filtering is applied can be set according to user operation of the directional buttons 205, a touch panel (not shown), a rotary dial (not shown), or the like.

(B) With the digital camera 100 of the above embodiment, the direction in which diorama filtering was applied was the up and down direction. Specifically, in the above embodiment, an example was given of using a diorama filter that vignetted the regions at the top and bottom of the screen, and did not vignette the band-like middle region in the up and down direction (the difference being whether or not vignetting was performed in the up and down direction of the screen). However, the present invention is not limited to this, and may be such that the user can specify the left and right direction as the direction in which diorama filtering is applied. In this case, the constitution may be such that the user can specify the position in which filtering is applied (the position of the range of no vignetting). For example, the constitution may be such that in filtering effect setting processing, the direction in which diorama filtering is applied can be set according to the operation of the directional buttons 205, a touch panel (not shown), or a rotary dial (not shown) by the user.

(C) With the digital camera 100 in the above embodiment, an example was given in which the display of MF assist was started in response to the pressing of the enter button 208 by the user. However, the present invention is not limited to this, and the MF assist display may be started as soon as the diorama filtering effect setting processing is completed.

(D) With the digital camera 100 in the above embodiment, an example was given in which the filter frame position P of the filtering effect was set to the middle in the up and down direction, and the MF assist frame location L of MF assist was set to the middle in the up and down direction and in the left and right direction, as the initial setting values for diorama filtering effect setting processing. However, if past setting information is stored in advance, this setting information may be read and the settings started from that state when the enter button 208 is pressed. More specifically, when the enter button 208 is pressed, the controller 130 first reads setting information, namely, the filter frame position P and the MF assist frame location L, from the flash memory 142. The controller 130 then displays the frame indicating the filter effect range, etc., superposed with the through-image, on the basis of this setting information.

(E) With the digital camera 100 of the above embodiment, the setting information (position) may be initialized by some kind of user operation, such as pressing a certain button, in filtering effect setting processing.

(F) With the digital camera 100 of the above embodiment, if the left button of the directional buttons 205 was pressed when the MF assist mode was on, the mode went to MF mode, and the position indicating the MF assist frame location L was enlarged in display. The present invention is not, however, limited to this. For example, the constitution may be such that when the left button is pressed, first an MF assist frame is displayed that indicates the area 604, which is the region that is enlarged in MF assist. If the left button is pressed again after the position of the MF assist frame has been changed with the directional buttons, MF assist may be enlarged in display.

Figure 9A:
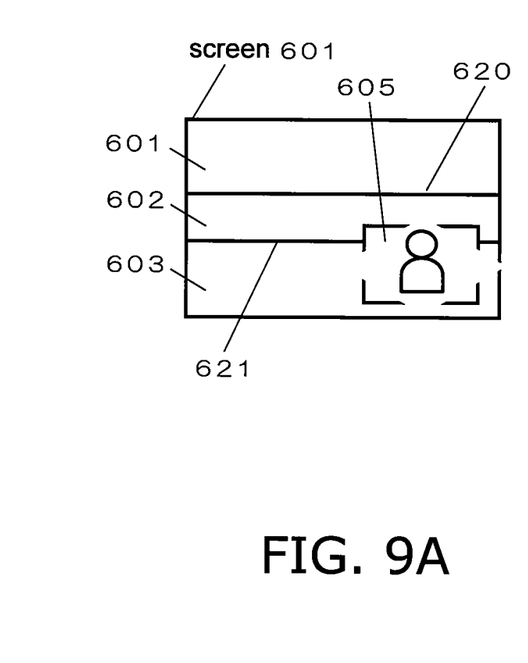
FIG. 9 is a diagram illustrating an example of the screen display pertaining to another embodiment.
Figure 9B:
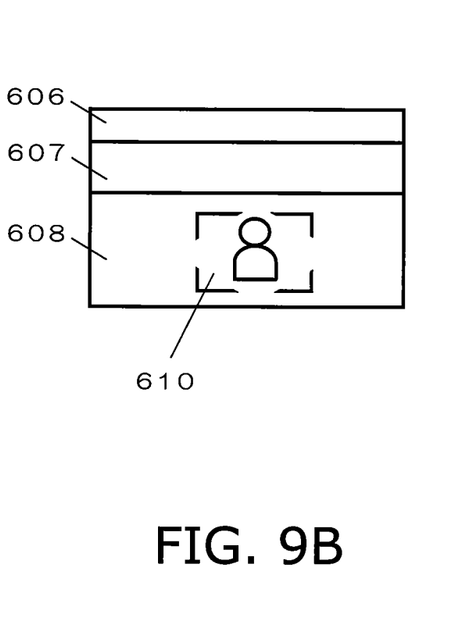
Figure 9C:
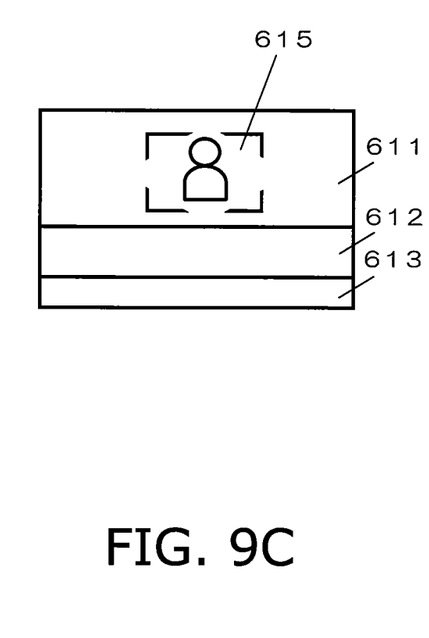

(G) With the digital camera 100 of the above embodiment, an example was given in which the images 605, 610, and 615 of the enlarged MF assist frame were disposed in the middle of the non-vignette areas 602, 607, and 612, but the images 605, 610, and 615 of the enlarged MF assist frame may be disposed somewhere else. More specifically, as shown in FIG. 9a, the enlarged MF assist frame may be displayed on the liquid crystal monitor 123 so that at least part of the image 605 of the enlarged MF assist frame is included in the vignette area. Also, as shown in FIGS. 9b and 9c, the images 610 and 615 of the enlarged MF assist frame may be displayed on the liquid crystal monitor 123 so that at least part of the images 610 and 615 of the enlarged MF assist frame are included in the area with the largest surface area (or region) among the plurality of vignette areas.

With this constitution, visibility of the images displayed in the non-vignette regions 602, 607, and 612 can be improved. Also, the above-mentioned visibility can be further improved if at least part of the images 605, 610, and 615 of the enlarged MF assist frame is disposed in relatively larger vignette areas.

(H) With the digital camera 100 in the above embodiment, just the enlarged MF assist frame may be movable. For example, if the interface component 150 is operated in a state in which the MF assist frame has been enlarged, the controller 130 controls the image processor 122 to move the enlarged MF assist frame to a position corresponding to the operation signal from the interface component 150, and display this frame on the liquid crystal monitor 123. Consequently, the MF assist frame shown in FIG. 6 can move to the position shown in FIG. 9. Also, just as when the liquid crystal monitor 123 is a touch panel, the enlarged MF assist frame may be selected and moved with some input means (such as a finger and/or a touch pen).

With this constitution, since the user can freely move the enlarged MF assist frame, an image that is covered up behind an enlarged MF assist frame can be easily viewed.

(I) With the digital camera 100 in the above embodiment, the MF assist frame defined by the MF assist frame location L was enlarged when the left button was pressed. In addition to this, the MF assist frame may be similarly enlarged when a focus ring (not shown) for operating the focus lens 111 is operated. In this case, the MF assist frame is enlarged in the same way as in the above embodiment when the controller 130 detects the rotation of the focus lens.

With this constitution, the focal state can be change according to the focusing operation performed by the user, and the MF assist frame (at least part of the non-vignette region) can be enlarged in display by the diorama filter. Also, the user can easily check the focal state of the subject by looking at the MF assist frame in enlarged display, which makes it easier to put the subject in focus.

INDUSTRIAL APPLICABILITY

The present invention provides an imaging device with which MF assist can be made more convenient, and therefore can also be applied to digital still cameras, movie cameras, portable telephones, and so forth with which manual focusing is possible.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Accordingly, these terms, as utilized to describe the present invention should be interpreted relative to an imaging device.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An imaging device comprising:
an imaging component configured to capture a subject image and produce image information corresponding to the subject image, the image information having:
a frame, the frame including a bar region therein, the bar region including the subject image and being moved on a display component;
and a separate region, the separate region disposed outside the frame;
an image processor configured to:
perform a vignette processing on the separate region to produce a vignetted image, the vignette processing including applying a diorama filter,
enlarge at least part of the bar region to produce an enlarged image, and
superimpose the vignetted image and the enlarged image to create a superimposed image; and
the display component configured to display the superimposed image.

2. The imaging device according to claim 1, wherein the display component is configured to display the superimposed image so that at least part of the enlarged image is included in the separate region.

3. The imaging device according to claim 2, wherein the separate region includes a plurality of regions, and the display component is configured to display the enlarged image so that at least part of the enlarged image is included in the largest region among the plurality of regions.

4. The imaging device according to claim 2, wherein when a command to change the display position of the enlarged image is issued from a controller, the display component moves the display of the enlarged image.

5. The imaging device according to claim 4, wherein the command is issued from the controller based on an operation signal produced by touching the display component, or based on an operation signal from an interface component.

6. An imaging device comprising:
an optical system configured to change the focal state of a subject image;
an imaging component configured to capture the subject image formed on the optical system and produce image information corresponding to the subject image, the image information having: a frame, the frame including a bar region therein, the bar region including the subject image and being moved on a display component;
and a separate region;
an image processor configured to:
perform a vignette processing on the separate region to produce a vignetted image, the vignette processing including applying a diorama filter, enlarge at least part of the bar region to produce an enlarged image when the focal state of the optical system has changed according to an operation signal from an interface component, and
superimpose the vignetted image and the enlarged image to create a superimposed image;
a display component configured to display the superimposed image; and
a controller configured to control at least one of the optical system, the image processor, and the display component.

* * * * *